(12) United States Patent
Lee et al.

(10) Patent No.: US 12,247,611 B2
(45) Date of Patent: Mar. 11, 2025

(54) BALL JOINT AND MANUFACTURING METHOD THEREFOR

(71) Applicant: ILJIN CO., LTD., Gyeongju-si (KR)

(72) Inventors: Yoon Geon Lee, Gyeongju-si (KR); Jae Hyung Lee, Busan (KR)

(73) Assignee: ILJIN Co., Ltd., Gyeongju-si (KR)

( * ) Notice: Subject to any disclaimer, the term of this patent is extended or adjusted under 35 U.S.C. 154(b) by 1297 days.

(21) Appl. No.: 15/999,732

(22) PCT Filed: Feb. 16, 2017

(86) PCT No.: PCT/KR2017/001701
§ 371 (c)(1),
(2) Date: Aug. 20, 2018

(87) PCT Pub. No.: WO2017/142322
PCT Pub. Date: Aug. 4, 2017

(65) Prior Publication Data
US 2019/0291525 A1   Sep. 26, 2019

(30) Foreign Application Priority Data

Feb. 19, 2016 (KR) .......................... 10 2016 0019767

(51) Int. Cl.
*F16C 11/06* (2006.01)
*B60G 7/00* (2006.01)

(52) U.S. Cl.
CPC ...... *F16C 11/0638* (2013.01); *F16C 11/0642* (2013.01); *F16C 11/0685* (2013.01); *B60G 7/005* (2013.01); *B60G 2204/416* (2013.01)

(58) Field of Classification Search
CPC .............. F16C 11/0614; F16C 11/0623; F16C 11/0628; F16C 11/0633; F16C 11/0638;
(Continued)

(56) References Cited

U.S. PATENT DOCUMENTS 4,615,638 A * 10/1986 Ito ....................... F16C 11/0638
403/135
4,750,885 A *  6/1988 Ito ....................... F16C 11/0638
403/133
(Continued)

FOREIGN PATENT DOCUMENTS

DE   4032541 A1   4/1992
DE  19647022 A1   5/1998
(Continued)

OTHER PUBLICATIONS

International Search Report and Written Opinion, issued in the corresponding PCT application No. PCT/KR2017/001701, dated May 10, 2017, 5 pages.
(Continued)

*Primary Examiner* — Josh Skroupa
*Assistant Examiner* — Kevin J Baynes
(74) *Attorney, Agent, or Firm* — Dinsmore & Shohl LLP; Yongsok Choi, Esq.

(57) ABSTRACT

A ball joint is disclosed. The ball joint comprises: a ball stud including a ball and a stud; a bearing coupled to the ball stud so as to surround the outer peripheral surface of the ball; a ball casing for accommodating the ball and the bearing therein; and an insert filled inside the ball casing, and coupled to the ball casing and the bearing, and further includes rotation-preventing wings extending outwards in the radial direction from the outer surface of the bearing, and coming into contact with the inner surface of the ball casing so as to prevent the bearing from rotating when an external pressure is applied to the bearing.

14 Claims, 6 Drawing Sheets

(58) Field of Classification Search
CPC .............. F16C 11/0642; F16C 11/0661; F16C 11/0685; Y10T 403/32647; Y10T 403/32655; Y10T 403/32729; B60G 7/005; B60G 2204/416; B60G 2204/418
See application file for complete search history.

(56) References Cited

U.S. PATENT DOCUMENTS

| | | | | |
|---|---|---|---|---|
| 4,995,755 | A | * | 2/1991 | Hyodo .................. B62D 7/163 29/510 |
| 5,152,628 | A | | 10/1992 | Broszat et al. |
| 5,772,337 | A | * | 6/1998 | Maughan ............ F16C 11/0638 384/206 |
| 5,904,436 | A | * | 5/1999 | Maughan ............ F16C 11/0647 403/140 |
| 6,109,816 | A | | 8/2000 | Iwasaki |
| 6,164,861 | A | * | 12/2000 | Maughan ............ F16C 11/0638 403/133 |
| 6,281,047 | B1 | * | 8/2001 | Wu ........................ H01L 21/56 257/E21.502 |
| 6,386,787 | B1 | * | 5/2002 | Reichelt ............. F16C 11/0638 403/140 |
| 6,821,047 | B2 | * | 11/2004 | Broker ................ F16C 11/0638 403/132 |
| 7,040,833 | B2 | * | 5/2006 | Kondoh ............. F16C 11/0638 403/135 |
| 8,905,417 | B2 | * | 12/2014 | Kuroda .............. F16C 11/0638 280/124.152 |
| 9,546,679 | B2 | * | 1/2017 | Sato ................... F16C 11/0638 |
| 2008/0255673 | A1 | | 10/2008 | Budde et al. |
| 2012/0141192 | A1 | | 6/2012 | Kwon |

FOREIGN PATENT DOCUMENTS

| | | | |
|---|---|---|---|
| DE | 19750830 | A1 | 5/1999 |
| DE | 19832254 | A1 | 1/2000 |
| DE | 29819487 | U1 | 3/2000 |
| DE | 102011076160 | A1 | 11/2012 |
| EP | 0027770 | A1 | 4/1981 |
| EP | 1432919 | B1 | 8/2006 |
| JP | 10151931 | | 6/1998 |
| JP | 2005155784 | | 6/2005 |
| JP | 2011137489 | | 7/2011 |
| KR | 1020070012697 | | 1/2007 |
| KR | 100880844 | | 3/2009 |
| KR | 1020110015814 | | 2/2011 |
| KR | 101573397 | | 12/2015 |
| WO | 2000026549 | A1 | 5/2000 |
| WO | 2003031835 | A1 | 4/2003 |
| WO | WO-2011021217 | A1 * | 2/2011 .......... F16C 11/0642 |

OTHER PUBLICATIONS

The extended European search report issued in European Application No. 17753483.1, mailed Sep. 26, 2019, 13 pages provided.
The extended European search report issued in European Application No. 17753483.1, dated Sep. 26, 2019.

* cited by examiner

BALL JOINT AND MANUFACTURING METHOD THEREFOR

TECHNICAL FIELD

The present disclosure relates to a ball joint and a method of manufacturing the same and, more particularly, to a ball joint in which assembly stability of a bearing is improved and to a method of manufacturing such a ball joint.

BACKGROUND

Generally, a suspension of a vehicle is an apparatus for connecting a vehicle body and a wheel, and includes a spring for absorbing vibration or shock transmitted from a road surface to the vehicle body, a shock absorber for adjusting the operation of the spring, a suspension arm or link for controlling the operation of a wheel, and so on.

A suspension arm or link of such a suspension is movable relative to the vehicle body or a wheel through a ball universal joint or a ball joint.

A conventional ball joint has a structure in which the ball of a ball stud is rotatably inserted into a housing, and includes a ball stud having a ball made of a rigid body, a housing or a ball joint case enclosing the ball stud, a bearing interposed between the housing and the ball of the ball stud so as to make the ball stud freely movable, and a dust cover configured to prevent foreign matter from infiltrating into the housing.

The above-mentioned conventional ball joint is usually manufactured through a series of processes as follows.

First, the case is seated on a lower plate of a mold, the bearing is mounted on the ball, and then the case is inserted into the lower plate of the mold so as to penetrate the case. Thereafter, an upper plate of the mold is closed, and an insert resin is injected between the respective molds, thereby performing insert injection molding. Then, the mold is opened and the dust cover is assembled onto the ball stud.

However, in the process of injecting the insert resin between the respective molds in the above-described conventional ball joint manufacturing process, the bearing is subjected to injection pressure of the insert region in the state in which the bearing is merely temporarily assembled to the ball. Thus, the posture of the bearing may not be held in a correct position. That is, due to the injection pressure, the bearing may slide from the surface of the ball and warp.

When the insert resin is injected in the state where the bearing has warped, defective molding of the ball joint may be caused, resulting in premature wear of the bearing, deterioration in durability of the ball joint, and the like.

Particularly, when the bearing is assembled to the ball, the approximate position of the bearing is adjusted depending on a manual operation. Thus, the problem of defective molding may be continuously generated.

SUMMARY

The present disclosure has been made in view of the above circumstances and provides a ball joint and a method of manufacturing the ball joint, in which a bearing temporarily assembled to a ball of a ball stud can be held in a correct position without warping even if the bearing is subjected to injection pressure, so that the moldability and productivity of the ball joint can be improved.

A ball joint according to an embodiment of the present disclosure may include: a ball stud including a ball and a stud; a bearing coupled to wrap an outer circumferential face of the ball; a ball casing configured to accommodate the ball and the bearing therein; an insert filled in the ball casing and engaged with the ball casing and the ball bearing; and an anti-rotation blade radially extending from an outer face of the bearing, and configured to come into contact with an inner face of the ball casing so as to prevent the bearing from rotating when an external pressure is applied to the bearing.

In an embodiment, the ball casing may have, on an inner face thereof, a support step formed to protrude radially inwards, and the support step may fix the anti-rotation blade.

In an embodiment, the ball casing may be formed in a cylindrical shape with two open faces facing opposite to each other in an axial direction, and the support step may be formed at the upper end edge of the ball casing.

In an embodiment, there may be provided a plurality of anti-rotation blades that are spaced apart from each other with a constant angle between them in a circumferential direction.

In an embodiment, the bearing may include a hemispherical cup-shaped bearing body having radially outer and inner faces, and the bearing body may have a curved boss provided on the outer face thereof such that the insert resin can smoothly flow along the outer face of the bearing body.

In an embodiment, the anti-rotation blade may include an upper edge extending radially outwards with a gentle slope from the boss and a lateral edge extending from an end of the upper edge in an axial direction, and a support face extending in the axial direction may be formed on one face of the support step, and may be in plane contact with the lateral edge.

In an embodiment, a plurality of ribs may be formed on the outer face of the bearing body, and may be disposed between the anti-rotation blades in the circumferential direction.

In an embodiment, the bearing mounted on the ball stud may be disposed concentrically with the center of the ball.

In an embodiment, the ball casing may have, on an inner face thereof, an uneven portion in which a groove and a protrusion are continuous in the axial direction.

In an embodiment, the ball casing may have, on an axial upper end face thereof, a concave recess, which is filled with an insert resin so as to increase bondability between the insert and the ball casing.

In an embodiment, the anti-rotation blades may protrude radially outwards from the outer face of the bearing body in a "+" shape.

In an embodiment, the bearing body has, in the inner face thereof, a lubricant retaining groove, which is recessed so as to retain lubricant therein.

A method for manufacturing a ball joint according to an embodiment of the present disclosure may include: manufacturing each a ball casing, a ball stud, a bearing, a dust cover, and a ring clip; mounting the ball casing on a lower mold; assembling the bearing to the ball stud; assembling the ball stud, which is assembled with the bearing, to the ball casing; closing an upper mold and injecting an insert resin; assembling the dust cover to the ball stud; and assembling the ring clip to the ball stud so as to fix the dust cover to the ball stud, the ball casing may have, on an inner face thereof, a support step formed to protrude radially inwards, and the bearing may have an anti-rotation blade seated and supported on the support step.

In an embodiment, the ball casing may be formed in a cylindrical shape with two open faces facing opposite to each other in an axial direction, and the support step may be formed at the upper end edge of the ball casing.

In an embodiment, there may be provided a plurality of anti-rotation blades that are spaced apart from each other with a constant angle between them in a circumferential direction.

In an embodiment, the bearing may include a hemispherical cup-shaped bearing body having radially outer and inner faces, and the bearing body may have a curved boss provided on the outer face thereof such that the insert resin can smoothly flow along the outer face of the bearing body.

In an embodiment, the anti-rotation blade includes an upper edge extending radially outwards with a gentle slope from the boss and a lateral edge extending from an end of the upper edge in an axial direction, and a support face extending in the axial direction may be formed on one face of the support step, and may be in plane contact with the lateral edge.

As described above, according to a ball joint according to an embodiment of the present disclosure, and a method for manufacturing the same, at least one anti-rotation blade is provided in the bearing enclosing the outer circumferential face of the ball of the ball stud, and the anti-rotation blade is mounted in a mold in the state of being in contact with the support step formed on the ball casing. Thus, even if an injection pressure acts on the bearing while the insert resin is injected into the mold, the bearing does not warp or rotate due to the interaction between the anti-rotation blade and the support step, thereby being held in the correct position.

Therefore, since the insert resin is injected in the state in which the bearing is seated in the correct position on the ball of the ball stud, the moldability of the ball joint can be improved. Furthermore, since the insert resin appropriately wraps the ball of the ball stud so as to ensure smooth rotational movements of the ball, the operability and durability of the ball joint can be secured.

DETAILED DESCRIPTION

Hereinafter, embodiments of the present disclosure will be described in detail with reference to the accompanying drawings.

Throughout the specification, when an element is described as "including" a certain constituent element, it means that other elements may be further included rather than being excluded unless specifically stated otherwise.

Throughout the specification, the same numbers denote the same or similar elements.

Figure 1:
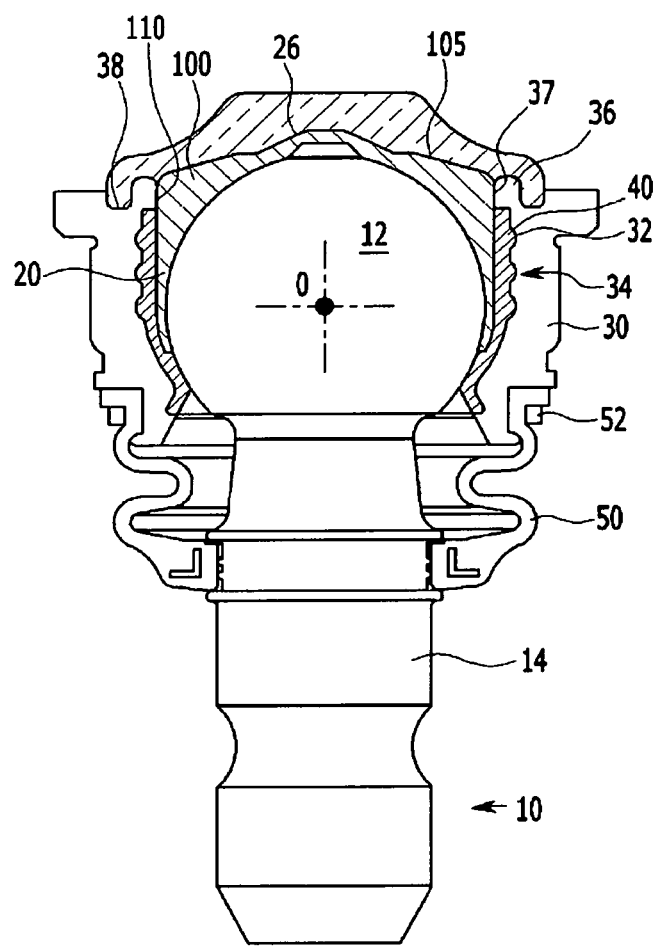
FIG. 1 is a cross-sectional view of a ball joint according to an embodiment of the present disclosure.

FIG. 1 is a cross-sectional view of a ball joint according to an embodiment of the present disclosure.

Referring to FIG. 1, a ball joint according to an embodiment of the present disclosure includes a ball stud 10 made of a rigid body, a bearing 20 configured to support the ball stud 10 to be freely movable, a ball casing 30 configured to accommodate a portion of the ball stud 10 and the bearing 20 therein, an insert 40 injected into the ball casing 30 to be engaged with the ball casing 30 and the bearing 20, and a dust cover 50 configured to cover a lower portion of the ball casing 30 so as to prevent infiltration of foreign matter.

The ball stud 10 includes a ball 12 provided thereon and a substantially cylindrical stud 14 formed integrally with the ball 12.

The ball stud 10 is press-fitted into the bearing 20 and the center O of the ball 12 is disposed concentrically with the center of the bearing 20. The stud 14 may be assembled to a vehicle body frame, a knuckle or link of a wheel, or the like.

The ball casing 30 is formed in a cylindrical shape which is opened in the axial direction. The radially inner face 32 of the ball casing 30 is provided with an uneven portion 34 in which a groove and a protrusion are continuous in the axial direction.

When an insert resin is inserted into and filled in the ball casing 30 with the uneven portion 34 and is then cured, the bondability between the ball casing 30 and the insert 40 can be increased. That is, the contact area between the ball casing 30 and the insert 40 is increased by the uneven portion 34. Further, directional bondability between the ball casing 30 and the insert 40 is increased due to the shape characteristic of the uneven portion 34. Thus, there is no fear that the ball casing 30 and the insert 40 are separated in the axial direction.

A concave groove 38 is formed in the axial upper end face of the ball casing 30 so as to be continuous in the circumferential direction. Thus, during the injection of the insert 40, the insert resin is filled in the concave groove 38, the bondability between the insert 40 and the casing 30 can be increased.

A support step 36 protruding radially inward may be formed at the axially upper end edge of the inner face 32 of the ball casing 30 so as to be continuous in the circumferential direction. The support step 36 serves to prevent warping or rotation of the bearing 20 during the injection of the insert resin. In addition, the support step 36 includes a support face 37, which is formed radially inside the support step 36, and the support face 37 is in contact with a portion of the bearing 20 during the injection of the insert resin. Accordingly, even if the injection pressure acts on the bearing 20 during the injection of the insert resin into the mold, the bearing 20 can be held in the correct position without rotating.

The lower opening of the ball casing 30 may be covered by the dust cover 50, which may be fixed by a ring clip 52. The dust cover 50 may serve to prevent foreign matter from infiltrating into the ball casing 30.

Figure 2:
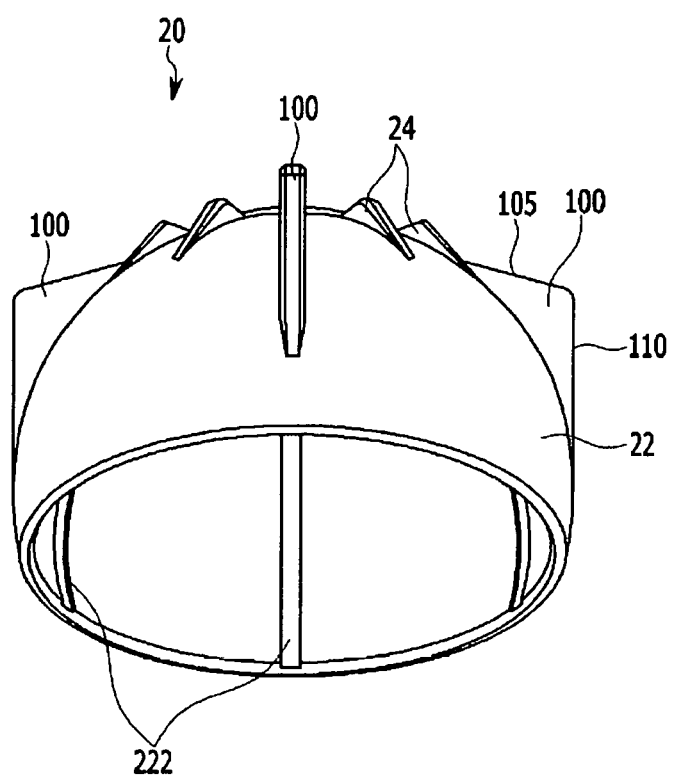
FIG. 2 is a perspective view of a bearing according to the embodiment of the present disclosure.
Figure 3:
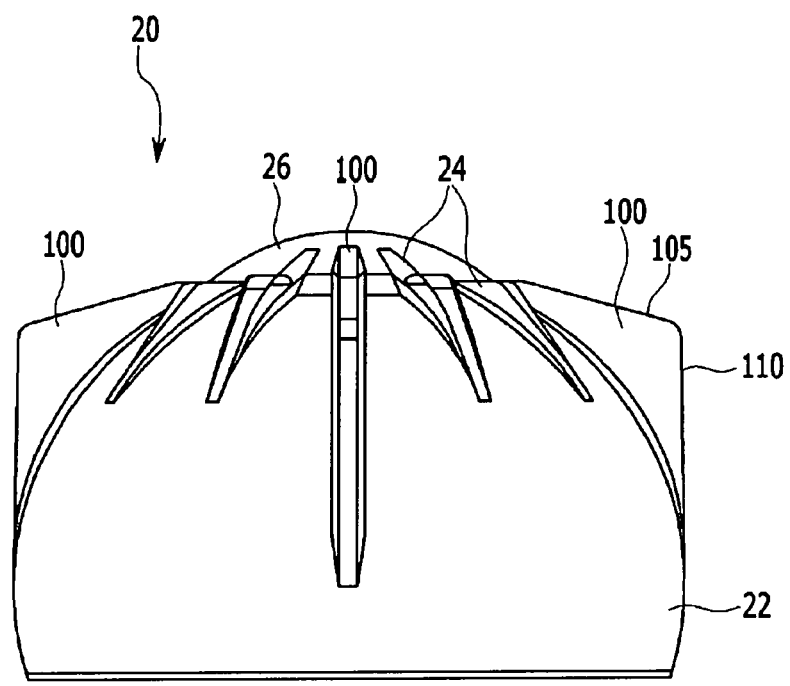
FIG. 3 is a front view of the bearing according to the embodiment of the present disclosure.
Figure 4:
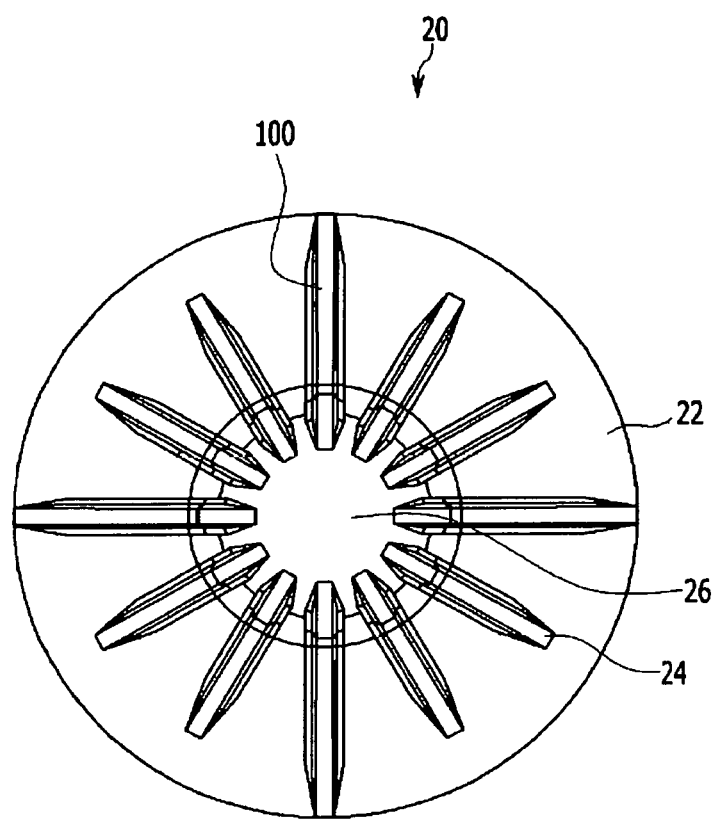
FIG. 4 is a top plan view of the bearing according to the embodiment of the present disclosure.

FIG. 2 is a perspective view of a bearing according to the embodiment of the present disclosure, FIG. 3 is a front view of the bearing according to the embodiment of the present disclosure, and FIG. 4 is a top plan view of the bearing according to the embodiment of the present disclosure.

Referring to FIGS. 2 to 4, the bearing 20 includes a hemispherical cup-shaped bearing body 22 having radially outer and inner faces, a plurality of ribs 24 provided on the upper portion of the outer face of the bearing body 22 so as to increase structural rigidity and bondability with an insert 40 according to increase in engagement area with the insert 40, and a boss 26 provided in a curved shape such that the insert resin smoothly is capable of flowing from the upper portion of the outer face of the bearing body 22 along the outer face of the bearing body 22.

The ribs 24 extend radially outward about the boss 26, and are arranged circumferentially at regular intervals. For example, the ribs 24 may be provided radially about the boss 26 in the bearing 20.

The ribs 24 may be formed in a triangular shape including a curvature edge conforming the curvature of the outer face of the bearing body 22 and two edges extending from both ends of the curvature edge at a predetermined angle.

Meanwhile, referring to FIG. 1, some of the ribs 24 extend radially outward more than the other ribs 24 so as to come into contact with the support step 36 in the ball casing 30. Hereinafter, the ribs 24, which are in contact with the ball casing 30 in this way, will be referred to as anti-rotation blades 100.

A plurality of anti-rotation blades 100 may be formed on the outer face of the bearing body 22 and are configured to come in contact with a portion of the inner face 32 of the ball casing 30. In addition, the plurality of anti-rotation blades 100 may be spaced apart from each other, and a plurality of ribs 24 may be disposed therebetween in circumferential direction. For example, four anti-rotation blades 100 may be arranged to have an included angle of 90 degrees with respect to each other in the circumferential direction (see FIG. 4), and the anti-rotation blades 100 may partially come into contact with the support step 36 located at the axially upper end edge of the casing 30, thereby fixing the position of the bearing 20.

Each of the anti-rotation blades 100 includes an upper edge 105 extending radially outward with a gentle inclination from the boss 26 of the bearing 20 and a lateral edge 110 extending downward from the upper end of the upper edge 105 and coming into contact with the support face 37 of the support step 36. As described above, since the support step 36 is formed on the inner face of the ball casing 30 in the circumferential direction and the lateral edges 110 of the anti-rotation blades 100 are in plane contact with the support face 37 of the support step 36, a frictional force is applied between the anti-rotation blades 100 and the support step 36 so as to prevent the bearing 20 from moving in the circumferential direction. Therefore, even if an external pressure acts on the bearing 20, it is possible to prevent the bearing 20 from rotating in the circumferential direction.

Since the side edges 110 of the anti-rotation blades 100 and the support surface 37 of the support jaw 36 are formed so as to cooperate with each other, the bearing 20 is completely prevented from rotating to one side or the other side about an axial direction.

Furthermore, since the anti-rotation blades 100 extend more radially outwardly than the other adjacent ribs 24, the engagement rigidity between the bearing body 22 and the insert 40 can be further increased.

The boss 26 is formed in a shape protruding upwards from the center of the upper face of the bearing body 22, and is formed to be curved such that the insert resin falling on the boss 26 flows naturally along the outer face of the bearing body 22.

A lubricant retaining groove 222 (see FIG. 2) may be formed on the inner face of the bearing body 22 in the form recessed toward the outer face. There may be provided a plurality of lubricant retaining grooves 222, which are arranged at predetermined intervals in the circumferential direction. The lubricant oil retaining grooves 222 serve to retain the lubricant therein so as to improve the lubricity of the bearing 20, and may extend along the inner face from the axially upper portion to the axially lower portion.

Figure 5:
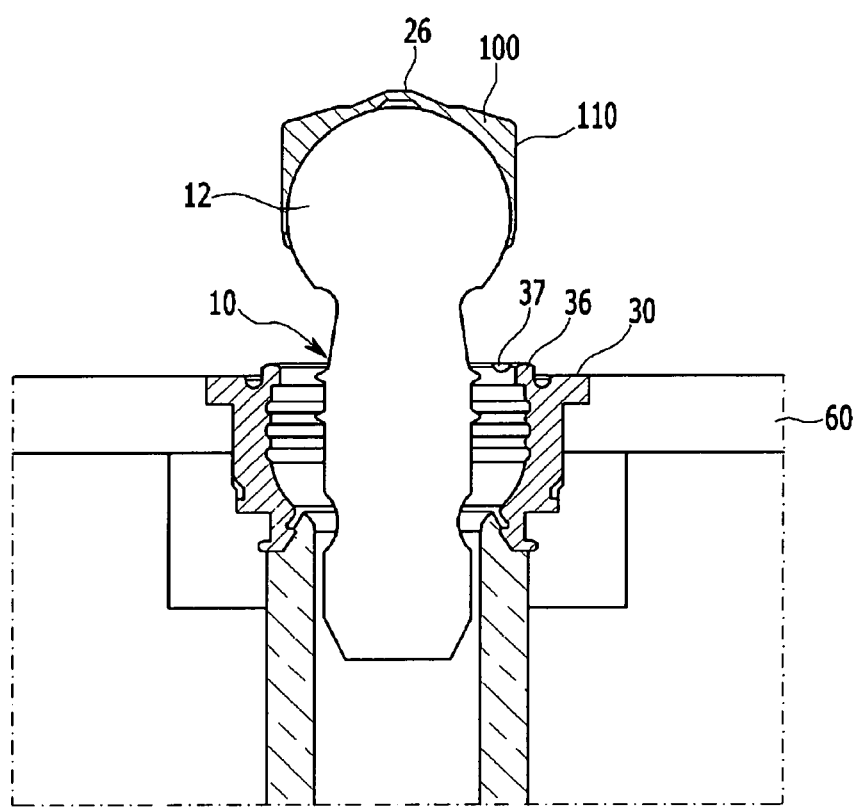
FIG. 5 is a first explanatory view of a ball joint manufacturing method according to an embodiment of the present disclosure.
Figure 6:
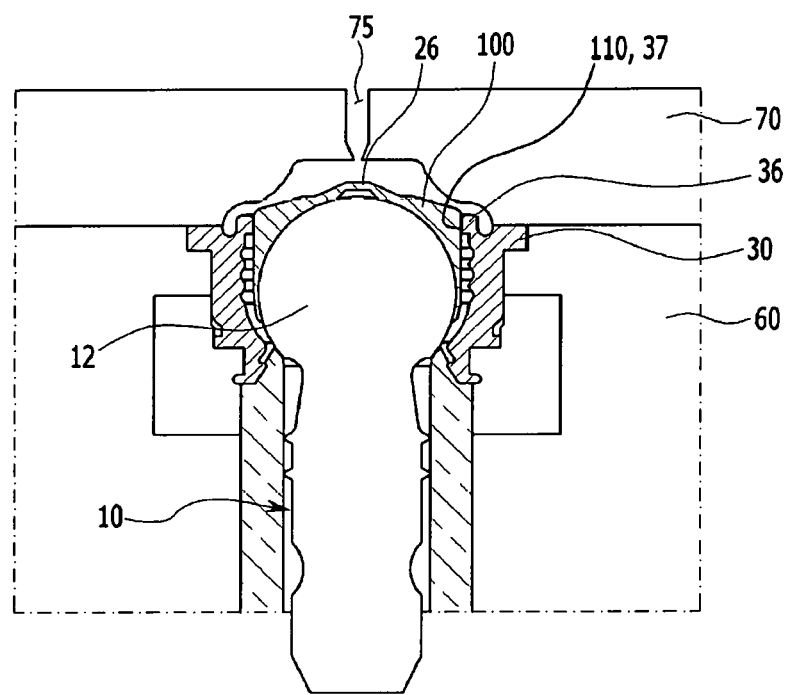
FIG. 6 is a second explanatory view of the ball joint manufacturing method according to the embodiment of the present disclosure.

FIG. 5 is a first explanatory view of a ball joint manufacturing method according to an embodiment of the present disclosure, and FIG. 6 is a second explanatory view of the ball joint manufacturing method according to the embodiment of the present disclosure.

A process of manufacturing the ball joint according to the embodiment of the present disclosure will be described with reference to FIGS. 5 and 6. A previously fabricated ball casing 30 is mounted on and fixed to the lower mold 60, and then the ball 12 of the ball stud 10 is inserted into the inside of the ball casing 30 in the state of being press-fitted into the bearing 20. A lubricant such as grease may be introduced between the ball 12 and the bearing 20.

When the bearing 20 is inserted into the ball casing 30 as described above, the anti-rotation blades 100 of the bearing 20 are fixedly in contact with the support step 36 of the ball casing 30. In this state, the upper mold 70 is closed and the insert resin is injected thereinto.

The insert resin is injected through the injection passage 75 in the upper mold 70, and the injection passage 75 is disposed concentrically with the center O of the ball 12. The insert resin injected from the injection path 75 is dropped to the boss 26 formed on the upper portion of the bearing 20 and is introduced between the plurality of anti-rotation blades 100 to flow in the circumferential direction along the outer curved face of the boss 26 such that the internal space between the ball casing 30 and the bearing 20 and the ball 12 is filled with the insert resin.

Meanwhile, the bearing 20 is subjected to an injection pressure during the injection of the insert resin. However, since the lateral edges 110 of the anti-rotation blades 100 of the bearing 20 are in plane contact with the support face 37 of the support step 36, the bearing 20 can be held in the correct position without warping or rotating. As a result, it is possible to avoid a factor of defective molding of the ball joint and to improve the durability of the bearing 20.

Thereafter, the ball stud 10, on which the insert 40 is injection molded, is released from the upper and lower molds 60 and 70, and then the dust cover 50 is fitted to the lower portion of the ball stud 10. Then, when the dust cover 50 is fastened and fixed to the ball stud 10 using a ring clip 52, the manufacture of the ball joint is completed.

While embodiments of the present disclosure have been described, the present disclosure is not limited to the embodiments, and includes all modifications that are easily made by those skilled in the art to which the present disclosure belongs and are thus deemed equivalent to the present disclosure.

What is claimed is:

1. A ball joint comprising:
   a ball stud including a ball and a stud;
   a bearing coupled to the ball stud to wrap an outer circumferential face of the ball;
   a ball casing configured to accommodate the ball and the bearing therein;
   an insert filled in the ball casing and engaged with the ball casing and the bearing; and
   at least one anti-rotation blade radially extending from an outer face of the bearing,
   wherein the ball casing has, on an inner face of the ball casing, a support step formed to protrude radially inwards and configured to fix the at least one anti-rotation blade,
   wherein the ball casing has a cylindrical shape with two open faces facing opposite to each other in an axial direction, and the support step is formed at an upper end edge of the inner face of the ball casing, and wherein the at least one anti-rotation blade is configured to come into contact with an inner face of the support step of the ball casing so as to prevent the bearing from rotating when an external pressure is applied to the bearing.

2. The ball joint of claim 1, wherein the at least one anti-rotation blade comprises a plurality of anti-rotation blades that radially extend from the outer face of the bearing, and the plurality of anti-rotation blades are spaced apart from each other with a constant angle between them in a circumferential direction.

3. The ball joint of claim 1, wherein the bearing includes a hemispherical cup-shaped bearing body having radially outer and inner faces, and the bearing body has a curved boss provided on the outer face thereof such that the insert can flow along the outer face of the bearing body.

4. A ball joint comprising:
a ball stud including a ball and a stud;
a bearing coupled to the ball stud to wrap an outer circumferential face of the ball;
a ball casing configured to accommodate the ball and the bearing therein;
an insert filled in the ball casing and engaged with the ball casing and the bearing; and
at least one anti-rotation blade radially extending from an outer face of the bearing;
wherein the ball casing has, on an inner face of the ball casing, a support step formed to protrude radially inwards and configured to fix the at least one anti-rotation blade,
wherein the ball casing has a cylindrical shape with two open faces facing opposite to each other in an axial direction, and the support step is formed at an upper end edge of the inner face of the ball casing, and
wherein the at least one anti-rotation blade is configured to come into contact with an inner face of the support step of the ball casing so as to prevent the bearing from rotating when an external pressure is applied to the bearing,
wherein the at least one anti-rotation blade comprises a plurality of anti-rotation blades that radially extend from the outer face of the bearing, and the anti-rotation blades are spaced apart from each other with a constant angle between them in a circumferential direction, and
wherein the plurality of anti-rotation blades each includes an upper edge extending radially outwards with a slope and a lateral edge extending from an end of the upper edge in an axial direction, and
the inner face of the support step is a support face formed to extend in the axial direction, the support face being in plane contact with the lateral edge.

5. The ball joint of claim 4, wherein the bearing body has a plurality of ribs formed on the outer face thereof, the plurality of ribs being disposed between the plurality of anti-rotation blades in the circumferential direction.

6. The ball joint of claim 5, wherein the bearing mounted on the ball stud is disposed concentrically with the center of the ball.

7. The ball joint of claim 6, wherein the ball casing has, on the inner face thereof, an uneven portion in which a groove and a protrusion are continuously provided in the axial direction.

8. The ball joint of claim 7, wherein the ball casing has, on an axial upper end face thereof, a concave recess, which is filled with the insert so as to increase bondability between the insert and the ball casing.

9. The ball joint of claim 8, wherein the plurality of anti-rotation blades protrude radially outwards from the outer face of the bearing body; and
wherein the plurality of anti-rotation blades form a "+" shape in unison.

10. The ball joint of claim 9, wherein the bearing body has, in the inner face thereof, a lubricant retaining groove, which is recessed so as to retain lubricant therein.

11. A method for manufacturing a ball joint, the method comprising:
manufacturing each of a ball casing, a ball stud, a bearing, a dust cover, and a ring clip;
mounting the ball casing on a lower mold;
assembling the bearing to the ball stud;
assembling the ball stud, which is assembled with the bearing, to the ball casing;
closing an upper mold and injecting an insert resin;
assembling the dust cover to the ball stud; and
assembling the ring clip to the ball casing so as to fix the dust cover to the ball stud,
wherein the bearing has at least one anti-rotation blade radially extending from an outer face of the bearing,
wherein the ball casing has, on an inner face of the ball casing, a support step formed to protrude radially inwards and configured to fix the at least one anti-rotation blade,
wherein the ball casing has a cylindrical shape with two open faces facing opposite to each other in an axial direction, and the support step is formed at an upper end edge of the inner face of the ball casing, and
wherein the at least one anti-rotation blade is configured to come into contact with an inner face of the support step of the ball casing so as to prevent the bearing from rotating when an external pressure is applied to the bearing.

12. The method of claim 11, wherein the at least one anti-rotation blade comprises a plurality of anti-rotation blades that radially extend from the outer face of the bearing, and the plurality of anti-rotation blades are spaced apart from each other with a constant angle between them in a circumferential direction.

13. The method of claim 12, wherein the bearing includes a hemispherical cup-shaped bearing body having radially outer and inner faces, and the bearing body has a curved boss provided on the outer face thereof such that the insert can flow along the outer face of the bearing body.

14. The method of claim 13, wherein each of the plurality of anti-rotation blades includes an upper edge extending radially outwards with a slope from the boss and a lateral edge extending from an end of the upper edge in an axial direction, and the inner face of the support step is a support face formed to extend in the axial direction, the support face being in plane contact with the lateral edge.

* * * * *